United States Patent
Zanola et al.

(10) Patent No.: US 11,047,726 B2
(45) Date of Patent: Jun. 29, 2021

(54) FLUID LEVEL SENSING DEVICE AND METHOD OF DETERMINING A FLUID LEVEL COMPRISING AN OPTICAL WAVEGUIDE WITH SUCCESSIVE ONES OF CURVED PORTIONS BEING CURVED IN ALTERNATING DIRECTIONS

(71) Applicants: The Boeing Company, Chicago, IL (US); Advanced Fibreoptic Engineering Ltd., Oxfordshire (GB)

(72) Inventors: Marco Zanola, Oxford (GB); Mark Johnson, London (GB)

(73) Assignee: The Boeing Company, Chicago, IL (US)

( * ) Notice: Subject to any disclaimer, the term of this patent is extended or adjusted under 35 U.S.C. 154(b) by 129 days.

(21) Appl. No.: 16/557,075

(22) Filed: Aug. 30, 2019

(65) Prior Publication Data
US 2020/0072653 A1 Mar. 5, 2020

(30) Foreign Application Priority Data
Aug. 31, 2018 (GB) ..................................... 1814239

(51) Int. Cl.
*G01F 23/292* (2006.01)
(52) U.S. Cl.
CPC ................... *G01F 23/292* (2013.01)
(58) Field of Classification Search
CPC ............... G01F 23/292; G01F 23/2925; Y10T 137/731; G01N 21/431; G01N 21/7703; G01N 21/552; G01N 21/432; B64F 5/10
(Continued)

(56) References Cited

U.S. PATENT DOCUMENTS 4,187,025 A 2/1980 Harmer
4,240,747 A * 12/1980 Harmer ............... G01F 23/2921
250/227.25
(Continued)

FOREIGN PATENT DOCUMENTS

CN 105444839 A 3/2016
CN 105547410 A 5/2016
(Continued)

OTHER PUBLICATIONS

United Kingdom Intellectual Property Office Search Report, dated Feb. 28, 2019, regarding Application No. GB1814239.8, 3 pages.
(Continued)

*Primary Examiner* — Que Tan Le
(74) *Attorney, Agent, or Firm* — Yee & Associates, P.C.

(57) ABSTRACT

A fluid level sensing device for determining the level of the interface between a first fluid and a second fluid in a container. The fluid level sensing device comprising an optical waveguide for disposal in the container for at least partial immersion in the first fluid; a light source for providing input light to the optical waveguide; and a light detector for sensing output light from the optical waveguide. The optical waveguide comprises a plurality of curved portions. Successive ones of the curved portions are curved in alternating directions. The optical waveguide is configured such that a curved portion immersed in the first fluid has a greater light loss profile than a curved portion not immersed in the first fluid. The output light from the optical waveguide provides a measure of the level of the interface based on light loss of the input light through the optical waveguide.

20 Claims, 14 Drawing Sheets

(58) Field of Classification Search
USPC .......... 250/227.11, 573, 577, 227.14, 227.25
See application file for complete search history.

(56) References Cited

U.S. PATENT DOCUMENTS

| | | | |
|---|---|---|---|
| 4,489,602 A | 12/1984 | Henning | |
| 6,422,073 B1 * | 7/2002 | Krahbichler | G01N 21/4133 |
| | | | 128/203.15 |
| 7,075,631 B2 | 7/2006 | Schnell | |
| 7,710,567 B1 | 5/2010 | Mentzer et al. | |
| 8,362,436 B1 | 1/2013 | Mentzer et al. | |
| 2011/0167905 A1 | 7/2011 | Arzberger et al. | |

FOREIGN PATENT DOCUMENTS

| | | |
|---|---|---|
| ES | 2339205 A1 | 5/2010 |
| JP | S6365321 A | 3/1988 |
| WO | WO2010074414 A2 | 7/2010 |

OTHER PUBLICATIONS

European Patent Office Extended Search Report, dated Jan. 27, 2020, regarding Application No. 19194785.2, 9 pages.

* cited by examiner

FLUID LEVEL SENSING DEVICE AND METHOD OF DETERMINING A FLUID LEVEL COMPRISING AN OPTICAL WAVEGUIDE WITH SUCCESSIVE ONES OF CURVED PORTIONS BEING CURVED IN ALTERNATING DIRECTIONS

CROSS-REFERENCE TO RELATED APPLICATION

This application claims the benefit of priority to Great Britain Application No. GB1814239.8, filed Aug. 31, 2018, entitled "Fluid Level Sensing Device and Method," which is incorporated herein by reference in its entirety.

TECHNICAL FIELD

The present disclosure relates to a fluid level sensing device and an associated method. In particular, the disclosure relates to a fluid level sensing device and method for determining the level of a fluid inside a container, such as a fuel tank, using optical sensing.

BACKGROUND

In many industrial, commercial, and military applications, there is a need to be able to determine the presence, and in particular the level, of a liquid inside a container, such as a tank, chamber, or other vessel. In some cases, the liquid(s) may be hazardous, such as volatile and/or combustible hydrocarbons. Example applications include fuel tanks for transport vehicles, such as cars, trucks, ships, and aircraft; and fuel, chemical, or other liquid tanks in oil refineries, fuel stations, airports, and chemical treatment plants, among others.

Discrete measurements of the liquid level, which take place at predetermined levels of the liquid in a container, may be useful in providing a general indication of liquid level. However, it is desirable to be able to precisely and continuously determine the liquid level in a container; for example, when measuring the fuel quantity available to an aircraft. This may be important in meeting safety and performance requirements for some applications. Known types of liquid level sensors used in such applications have been based on electrical devices, with sensing based on capacitance, resistance, or ultrasound transducers. However, such sensing devices can introduce a possible source of ignition inside the container and may therefore be undesirable, or require careful design, management, and maintenance to avoid potentially catastrophic events from taking place should a fault occur.

An alternative approach to sensing the presence and/or level of liquid in a container is based on the use of light, for example guided by means of passive optical structures. In this way, active components, such as light sources and detectors may be placed outside the container—and therefore away from the hazardous or dangerous zone—while passive, optical waveguides may be placed inside the container for the liquid level sensing.

Systems and methods are present for measuring the level of a fluid in a container, and/or identifying the type of fluid or fluids in the container. The methods comprise directing optical energy through a first plurality of optical waveguides each having an end face immersed in one or more types of fluids, and measuring the optical energy that is transmitted through the one or more types of fluids to a second plurality of optical waveguides each having an end face that opposes and is spaced apart from an associated one of the end faces of the first plurality of optical waveguides. The methods also comprise determining a level or levels of the one or more fluids based on (i) the optical energy that is transmitted through the one or more types of fluids, and (ii) relative locations of the end faces of the first and/or second plurality of optical waveguides. The precision of such an arrangement depends on the number of waveguides used, and the use of many waveguides can increase the system complexity considerably.

A fiberoptic filling level determination apparatus, for liquid transparent media disposed in containers, has a light wave conductor that is at least partially immersible in the medium and is connected to a light source disposed externally of the container, whereby the difference in intensity between introduced light and exiting light is used to determine the filling level of the medium in the container. The light wave conductor is disposed in the interior of the container, whereby an input section of the light wave conductor that is connected to the light source is guided in the container, in a helical path, to the deepest level of the container that is accessible for the filling level determination, and from here is guided out of the container as a linear output section, and that associated with the input section and the output section, externally of the container, is a respective device for measuring the intensity (I) of the introduced and the exiting light, and the ratio of the intensity measured by the devices (I output/I input) can be represented in a filling level value.

While this approach may offer continuous sensing of liquid level variation, the apparatus may suffer from low sensitivity. In particular, it is understood that higher-order propagation modes of light are lost or strongly absorbed within the first few helical windings of the light wave conductor, leaving only low order modes propagating down the light guide. Lower order modes are less affected by the presence of liquid than higher order modes, therefore reducing the overall sensitivity of the device.

Alternative and/or improved liquid level sensing techniques in view of the above background would therefore be of interest.

SUMMARY

According to a first aspect, there is provided a fluid level sensing device for determining the level of the interface between a first fluid and a second fluid in a container, the device comprising: an optical waveguide for disposal in the container for at least partial immersion in the first fluid; a light source for providing input light to the optical waveguide; and a light detector for sensing output light from the optical waveguide, wherein the optical waveguide comprises a plurality of curved portions, successive ones of the curved portions being curved in alternating directions, and wherein the optical waveguide is configured such that a curved portion immersed in the first fluid has a greater light loss profile than a curved portion not immersed in the first fluid, and the output light from the optical waveguide provides a measure of the level of the interface based on light loss of the input light through the optical waveguide, and wherein a sensing portion of the optical waveguide is configured to extend in a first direction, the first direction being substantially perpendicular to the interface between the first and second fluids, and successive curved portions are spaced in the first direction and overlap such that at least one curved portion is present at any point in the first direction in the sensing portion of the optical waveguide.

In this way, light may be lost from the curved portions of the optical waveguide in a measurable and predictable way. The output light from the optical waveguide may therefore be used to provide a measure of the level of the first fluid interface. The amount of optical power lost from the input light through the optical waveguide depends on the level of the first fluid in the container. This, in turn, affects the number of curved portions immersed in, or wetted by, the first fluid and therefore the amount of light lost from the optical waveguide into the first fluid. By relating the detected output light to the fluid level for any given fluid, a continuous fluid level sensing device may be provided. That is, continuous variation in the fluid level may be measured using a single optical waveguide.

Successive curved portions of the optical waveguide are configured to curve in alternating directions. In this way, the optical waveguide may take the form of a serpentine, or sinuous, or meandering, or alternately curving, waveguide. In some embodiments, the optical waveguide may be sinusoidal. A first curved portion may be curved in an anticlockwise direction and a successive or following curved portion may be curved in a clockwise direction, and so on. The directions could alternatively be reversed. It is understood that this configuration of the curved portions promotes transfer of optical power of the input light from low-order propagation modes to high-order propagation modes in the optical waveguide. Higher order modes have a deeper propagation depth outside the cross section of the optical waveguide, effectively increasing exposure to the surrounding medium. As such, high-order propagation modes tend to be lost more readily into an external medium—such as the first fluid—in particular when being guided in a bent optical waveguide. Bending an optical waveguide also affects the total internal reflection characteristic, or regime, of the waveguide, which leads to higher optical losses for smaller bending radiuses, or smaller curves more generally. This helps to improve the sensitivity of the device by providing for a significant light loss profile at each curved portion through the optical waveguide.

The total internal reflection regime of the optical waveguide is also affected by the refractive index of the medium surrounding the optical waveguide. The optical properties of the surrounding medium, such as refractive index and optical absorption, influence the optical losses of the light propagating in the optical waveguide. When the surrounding medium is a liquid with a refractive index higher than air or a vacuum, the output light detected may be directly correlated to the extent of the optical waveguide wetted by the liquid.

A sensing portion of the optical waveguide is configured to extend in a first direction, the first direction being substantially perpendicular to the interface between the first and second fluids, and successive curved portions are spaced in the first direction and overlap such at least one curved portion is present at any point in the first direction in the sensing portion of the optical waveguide. In this way, the sensing device may provide a continuous curved—and therefore light loss prone or susceptible—component of the optical waveguide along the full extent of the sensing portion of the optical waveguide. Continuous measurement of the fluid level throughout the sensing portion may therefore be achieved.

In one or more embodiments, the optical waveguide comprises an optical fibre. An optical fibre may be readily formed or configured to take the desired shapes and pattern of the described optical waveguide.

In one or more embodiments, each of the plurality of curved portions of the optical waveguide is a planar curved portion. In one or more embodiments, each planar curved portion lies in the same plane. In one or more embodiments, each of the plurality of curved portions respectively lies in a plane generally perpendicular to the interface between the first and second fluids. In these ways, the curved portions of the optical waveguide may be fully and/or optimally exposed to variations in the level of the first fluid, since the curved portions are directed into (or out of) the interface between the first and second fluids, perpendicular to the interface. Thus, changes in the level of the fluid interface directly affect the wetting of the optical waveguide—in particular, the curved portion closest to, or at, the level of the fluid interface. In turn, the optical losses from the optical waveguide correspondingly change, providing a measure of the level of the fluid interface.

The configuration of the curved portions in a planar arrangement also provides for a simple and relatively small footprint sensing device, so as not to occupy a large volume of the container in which it is disposed and used. The configuration also helps to reduce or minimise the possibility of liquid residuals building up around or in proximity to the optical waveguide over time and potentially causing spurious readings. In embodiments with the curved portions being planar and preferably in the same plane, perpendicular to the interface between the first and second fluids, the curved portions also generally lie in a plane parallel or near-parallel to the gravitational forces acting on the fluid(s) in the container. The configuration and orientation of the curved portions allows for the fluid to naturally flow and run off the sensing device, reducing or minimising residuals on the optical waveguide.

In one or more embodiments, the optical waveguide further comprises a respective straight portion configured between successive curved portions. This arrangement can help with light distribution in the optical waveguide as the light passes from one curved portion to the next curved portion. In particular, the arrangement may help to promote the transfer of optical power from low-order propagation modes to high-order propagation modes at each curved portion of the optical waveguide. This can help to increase the optical losses at each curved portion by enhancing the exposure of the propagating input light to the external medium along the length of the sensing device.

In one or more embodiments, one or more of the plurality of curved portions has a varying curvature. In this way, the curved portions may be tailored to the particular container in which the sensing device is to be used and/or for a particular level of sensitivity or light loss profile along the optical waveguide. In one example, a radius of curvature of one or more curved portion may be reduced along the bend of the curved portion. This may allow for a more gradual loss of light within the curved portion.

In one or more embodiments, the plurality of curved portions have the same size and shape. In this way, the performance and light loss profile of the curved portions along the sensing device may be known and consistent, providing a relatively simple configuration.

In one or more embodiments, one or more of the plurality of curved portions comprises a smaller curved portion than the remainder of the plurality of curved portions. For example, a first plurality of the curved portions may comprise a plurality of curved portions having curved portions of a first size and one curved portion having a curved portion of a second size smaller than the first size. In this way, with increased light loss at a relatively smaller bend—for example, having a smaller radius of curvature for a round bend—the detected output light may show a distinct or marked change at that particular curved portion. As such, the marked change in detected output light can be readily correlated to the known level of the particular curved portion, allowing for the sensing device to self-calibrate during use, to avoid any potential mis-readings due to drift etc.

In one or more embodiments, the plurality of curved portions have different sizes and/or shapes. In this way, the sensing device may be configured for any particular desired application or container type or fluid composition.

In one or more embodiments, the optical waveguide comprises an optical fibre and the device further comprises a frame comprising a plurality of guide members for supporting the optical fibre, each guide member defining a location, shape, and size of a respective one of the plurality of curved portions of the optical fibre. An optical waveguide in the form of an optical fibre supported on a frame provides for a simple, stable, and reproducible sensing device. An optical fibre may be readily directed about the guide members of the frame, without requiring complex or time-consuming installation. The frame also helps to maintain the configuration of the optical waveguide, especially in applications where the container is subject to movement, including sudden and significant movement, such as with a fuel tank of an aircraft.

In one or more embodiments, each guide member comprises a plate having a peripheral groove, wherein the optical fibre is supported at least by partial engagement with the peripheral grooves of the plates. Providing peripheral grooves around guide member plates allows for more secure installation and retention of an optical fibre in the frame.

In one or more embodiments, the guide members may take other forms which provide for supporting and guiding the optical waveguide. The guide members may also provide for fluid run-off from the optical waveguide, in particular at the curved portions. For example, each guide member may comprise a set of discrete supports, such as pins, providing a curved pathway around which the optical waveguide may be configured. In this way, the combination of alternating bends of the optical waveguide and the pressure on the optical waveguide from the pins can provide for desired or increased light losses through the optical waveguide.

In one or more embodiments, the optical waveguide comprises a reflective means at one end and the light source and the light detector are configured at the other end of the optical waveguide. In this way, both the light source and the light detector may be located at the same end of the optical waveguide, to simplify construction and installation of the sensing device with a container.

In one or more embodiments, the device further comprises a second optical waveguide, wherein the second optical waveguide is inverted or offset from the first optical waveguide. The second optical waveguide may have a sensing portion which is similar, or identical, to the sensing portion of the first optical waveguide. In this way, the sensing portion of the second optical waveguide may be offset in the first direction from the sensing portion of the first optical waveguide. Alternatively or additionally, the sensing portion of the second optical waveguide may be rotated about the first direction by 180° from the sensing portion of the first optical waveguide. This may provide for redundancy in measurement, in case of failure of one optical waveguide. This may also or alternatively provide additional sensitivity to the device for certain applications.

In one or more embodiments, the first fluid has a first refractive index and the second fluid has a second refractive index, and the optical waveguide has a third refractive index or a combination of refractive indices so that the light loss is increased or maximised for the first fluid rather than the second fluid. The light loss of the input light through the optical waveguide may thereby be substantially dependent on the level of the first fluid. In this way, the sensing device may be used to selectively measure the level of a particular fluid, such as the first fluid, only, when there may be two or more fluids in the container. This may apply in cases where a tank contains fuel and water, for example, and it is only desired to know the level of the fuel.

According to a further aspect, there is provided a container comprising the described fluid level sensing device. Optionally, the container is a fuel tank of a vehicle, such as an aircraft.

According to a further aspect, there is provided a method of determining the level of the interface between a first fluid and a second fluid in a container, the method comprising: providing input light to an optical waveguide disposed in the container and at least partially immersed in the first fluid; guiding the input light through a plurality of curved portions of the optical waveguide, successive ones of the curved portions being curved in alternating directions, wherein a curved portion immersed in the first fluid has a greater light loss profile than a curved portion not immersed in the first fluid; and detecting output light from the optical waveguide, the output light providing a measure of the level of the interface based on light loss of the input light through the optical waveguide.

In one or more embodiments, the method further comprises continuously determining the level of the interface. For example, the method may determine the level of the interface at any point within the sensing portion of the optical waveguide.

In one or more embodiments, the method further comprises transferring optical power of the input light to high-order propagation modes by providing a respective straight portion of the optical waveguide between successive curved portions.

In one or more embodiments, one or more of the plurality of curved portions comprises a smaller curved portion than the remainder of the plurality of curved portions, the method further comprising calibrating the determined level of the interface based on an expected change in detected output light at the smaller curved portion.

In one or more embodiments, the optical waveguide is part of the described fluid sensing device.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
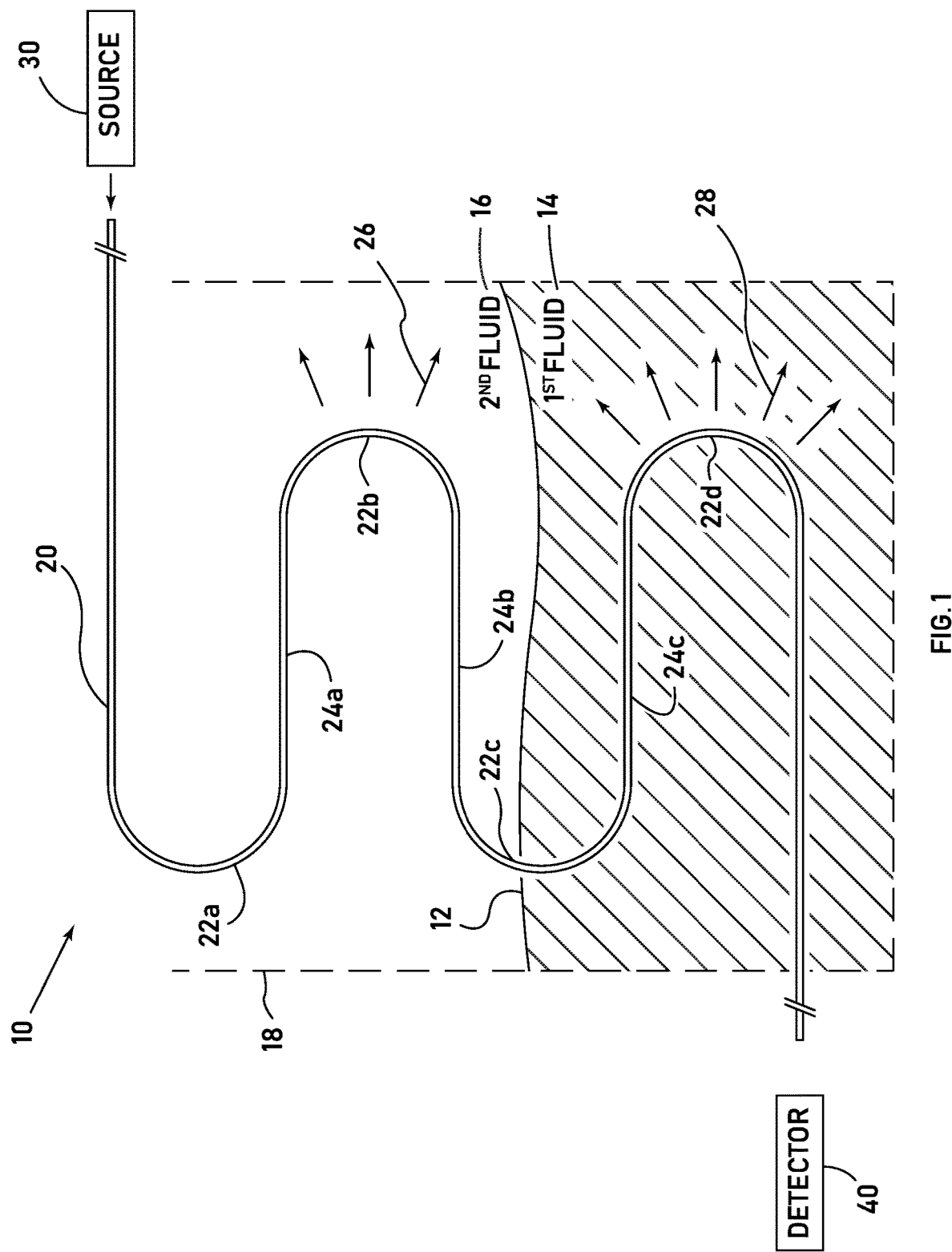
FIG. 1 schematically shows a fluid level sensing device in accordance with one embodiment in accordance with an illustrative embodiment.

Referring to FIG. 1, there is shown a fluid level sensing device 10 in accordance with one embodiment. The fluid level sensing device 10 is for determining the level of the interface 12 between a first fluid 14 and a second fluid 16 in a container 18 (shown in dashed outline). The fluid level sensing device 10 comprises an optical waveguide 20 for disposal in the container 18 for at least partial immersion in the first fluid 14. The fluid level sensing device 10 also comprises a light source 30 for providing input light to the optical waveguide 20. The fluid level sensing device 10 also comprises a light detector 40 for sensing output light from the optical waveguide 20.

The optical waveguide 20 comprises a plurality of curved portions 22a-d, successive ones of which are curved in alternating directions. The curved portions 22a-d are interconnected by a respective straight portion 24a-c. In this way, the optical waveguide 20 is configured with a serpentine, or sinuous, or meandering, or alternately curving form. The straight portions 24a-c are shown in this embodiment as being generally parallel to each other and also generally parallel to the interface 12 between the first and second fluids 14, 16. On the other hand, the curved portions 22a-d are shown as planar curved portions, with each planar curved portion lying in the same plane. This plane is generally perpendicular to the interface 12 between the first and second fluids 14, 16.

In the embodiment shown, the curved portions 22a-d have a similar size and shape. In this case, the curved portions 22a-d have a generally half-circle shape, and have a constant radius of curvature. However, the direction of curvature of the curved portions alternates along the optical waveguide 20. That is, first curved portion 22a is curved in an anti-clockwise direction, while second curved portion 22b is curved in a clockwise direction, and third curved portion 22c is again curved in an anticlockwise direction, followed by fourth curved portion 22d which is again curved in a clockwise direction. In this way, the optical waveguide 20 provides a waveguide through which light may propagate from side to side, repeatedly, down the length of the sensing portion or zone of the waveguide. Of course, the direction of curvature of the curved portions could be reversed in another embodiment.

The light source 30 is configured to provide input light to the optical waveguide 20. The input light may be provided by a light-emitting diode (LED), a superluminescent diode (SLED or SLD), or a laser diode. The laser diode may be configured to operate either in a continuous wave (CW) regime or in a pulsated regime. The output power or intensity of the light source 30 may be known and constant. Alternatively, the light source 30 may include an intensity measuring device to measure the intensity of the input light, so that possible variations or drift over time can be accounted for.

The input light passes along the optical waveguide 20 towards the light detector 40. Some light is lost from the optical waveguide 20 during propagation along the waveguide. The light detector 40 is configured to sense the output light from the optical waveguide 20 and to measure the output power or intensity of the output light. The light detector 40 may be provided by a photodetector, or by multiple photodetectors optimized to sense different wavelengths of light. In embodiments in which the light source 30 is pulsed, the light detector 40 may be configured to be synchronized with the light source to ensure reliable and accurate detection of the output light. Based on the measured power or intensity of the output light, or based on a relative comparison between the measured power or intensity of the input and output light, the fluid level sensing device 10 may provide an indication or measure of the light lost during propagation through the optical waveguide 20. The amount of light lost from the optical waveguide 20 may be affected by the level or amount, and the type, of fluids in the container 18 in which the fluid level sensing device 10 is used.

The amount of optical power lost from the input light through the optical waveguide 20 depends on the level of the first fluid 14 in the container 18 and on the level of the second fluid 16. For example, the first fluid 14 may be a liquid. The liquid may be fuel, such as aviation fuel for an aircraft (e.g., Jet A, Jet A-1, or Jet B). The second fluid 16 may be a gas, such as air. In the example of FIG. 1, the interface 12 between the first and second fluids 14, 16 is shown. The first and second curved portions 22*a,b* are surrounded by the second fluid 16, such as air. The fourth curved portion 22*d* is shown fully immersed in the first fluid 14, such as fuel. The third curved portion 22*c* is shown passing through or across the interface 12, with one part of the curved portion surrounded by the second fluid 16 and the other part of the curved portion surrounded by the first fluid 14. The light lost during propagation along the third curved portion 22*c* is higher than that along the first and second curved portions 22*a,b*, but is lower than that along the fourth curved portion 22*d*. Accordingly, the fluid level in the container 18 may be continuously determined and not only at discrete levels, the continuous determination being in dependence upon the extent of the wetting of a particular curved portion, rather than taking a curved portion as a whole, discrete measurement level.

Thus, the level of the interface 12 affects the number of curved portions 22 immersed in, or wetted by, the first fluid 14 and therefore the amount of light lost from the optical waveguide 20 into the first fluid 14. The optical waveguide 20 is configured such that a curved portion immersed in the first fluid 14 has a greater light loss profile than a curved portion not immersed in the first fluid (i.e., surrounded by the second fluid 16). This is schematically shown in FIG. 1 by the 'optical losses' arrows 26, showing optical losses from the second curved portion 22*b* which is surrounded by the second fluid 16. On the other hand, the 'optical losses' arrows 28 show greater optical losses from the fourth curved portion 22*d* which is surrounded by the first fluid 14. Because, for example, a liquid such as jet fuel has a greater refractive index than air, the optical loss profile of light at the fourth curved portion 22*d* will be greater than at the second curved portion 22*b*.

The output light from the optical waveguide 20 thus provides a measure of the level of the interface 12 based on light loss of the input light through the optical waveguide. By relating the detected output light to the fluid level for any given fluid, a continuous fluid level sensing device may be provided. That is, continuous variation in the fluid level may be measured using a single optical waveguide.

In use, the fluid level sensing device 10 is disposed in a container 18 holding a first fluid 14 and a second fluid 16. The optical waveguide 20 is at least partially immersed in the first fluid 14, such that the third and fourth curved portions 22*c,d* are at least partially wetted by the first fluid 14. Input light is provided by the light source 30 into the optical waveguide 20. The input light is guided through the plurality of curved portions 22*a-d* and the plurality of connecting, straight portions 24*a-c* of the optical waveguide 20. In propagating along the optical waveguide 20, optical losses occur (as shown at least by arrows 26, 28), in particular at the bends in the optical waveguide. Curved portions immersed in the first fluid 14 have a greater light loss profile than curved portions surrounded by the second fluid 16. As such, the level of the interface 12 affects the magnitude or extent of the optical losses taking place. The light output from the optical waveguide 20 is detected by the light detector 40. The detected output light, either by itself or by comparison with the input light, provides a measure of the level of the interface based on light loss of the input light through the optical waveguide 20.

In some embodiments, a look-up table may be used to relate the power or intensity of the detected output light to the level of the interface 12 in the container 18.

While the light source 30 has been shown at one end of the optical waveguide 20 and the light detector 40 has been shown at the other end of the optical waveguide, the configuration of the light source and the light detector could be reversed in another embodiment.

Also, while the container 18 is shown in broken lines schematically in FIG. 1, it will be understood that the container may have an open top but typically will be a substantially closed container, such as a tank. Suitable access openings and appropriate sealing for the fluid level sensing device 10 may be provided to allow for sensing without compromising the function, integrity, or safety of the container itself.

Figure 2:
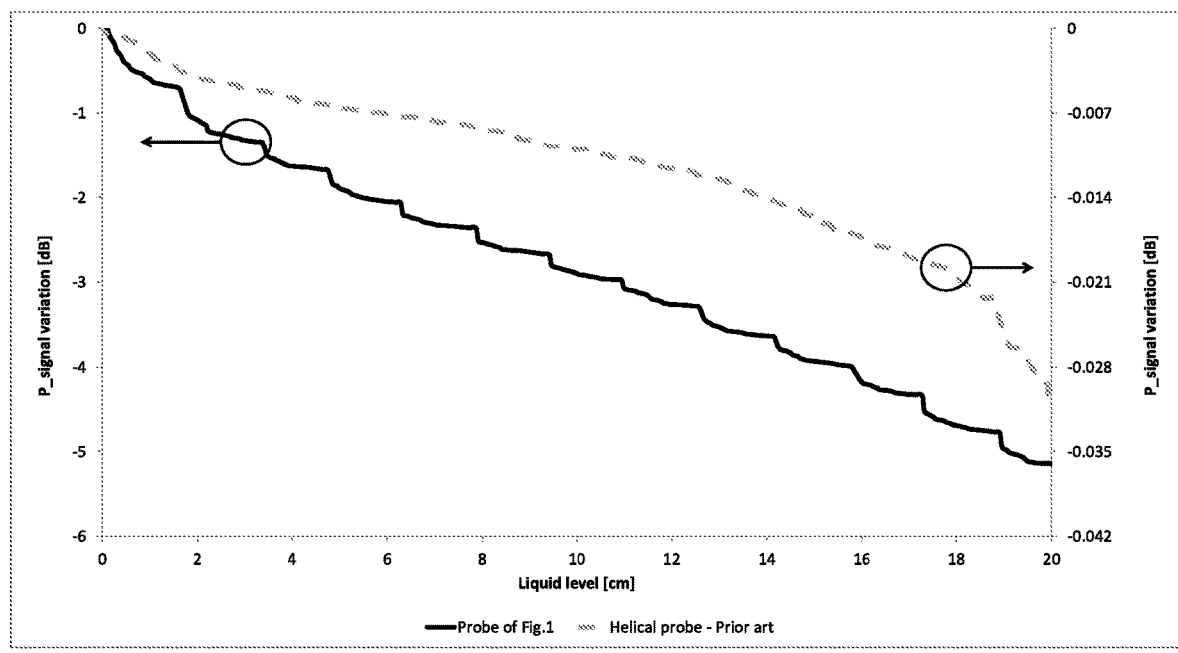
FIG. 2 shows a graph of optical power variation with liquid level for the fluid level sensing device of FIG. 1 and for a helical arrangement in accordance with an illustrative embodiment.

FIG. 2 shows the results of an experimental comparison of the embodiment shown in FIG. 1 against an arrangement using a helical probe. A cylindrical tank was provided with a 0 cm level marking and graduated up to a 20 cm level marking. In a first test, the fluid level sensing device 10 of FIG. 1 was configured in the tank and the tank was filled from 0 cm up to 20 cm with aviation grade kerosene. During this procedure, the optical power of the output light from the optical waveguide 20 was detected by the light detector 40. The same procedure was then carried out using a helical probe. In both cases, the fluid level sensing device and the helical probe were configured from a commercially available, off-the-shelf, plastic optical fiber and the fluid used was identical. For the principle demonstration purposes of these experiments, the optical fiber used was a Super ESKA™, SK40 optical fiber of 1.0 mm diameter (with a core diameter of 0.98 mm), manufactured by Mitsubishi Chemical. As will be appreciated, the type, composition, and/or size of the optical fiber, or optical waveguide in general, selected for use may depend on the application the fluid level sensing device is to be used for and the level of durability desired or required.

In the graph shown in FIG. 2, the plots are of output power signal variation and are expressed on a logarithmic scale (in dB), to facilitate a comparison of the two results. The signal variation is referenced to 0 dB for an empty tank. The left-hand scale and the solid plot are for the probe of FIG. 1, while the right-hand scale and the dashed plot are for the helical probe.

From FIG. 2, it can be seen that the signal variation with varying liquid level in the tank for the arrangement shown in FIG. 1 is several orders of magnitude greater than that for the helical probe. As such, the arrangement of FIG. 1 can be seen to provide a significant improvement in sensitivity for a fluid level sensing device.

Figure 3:
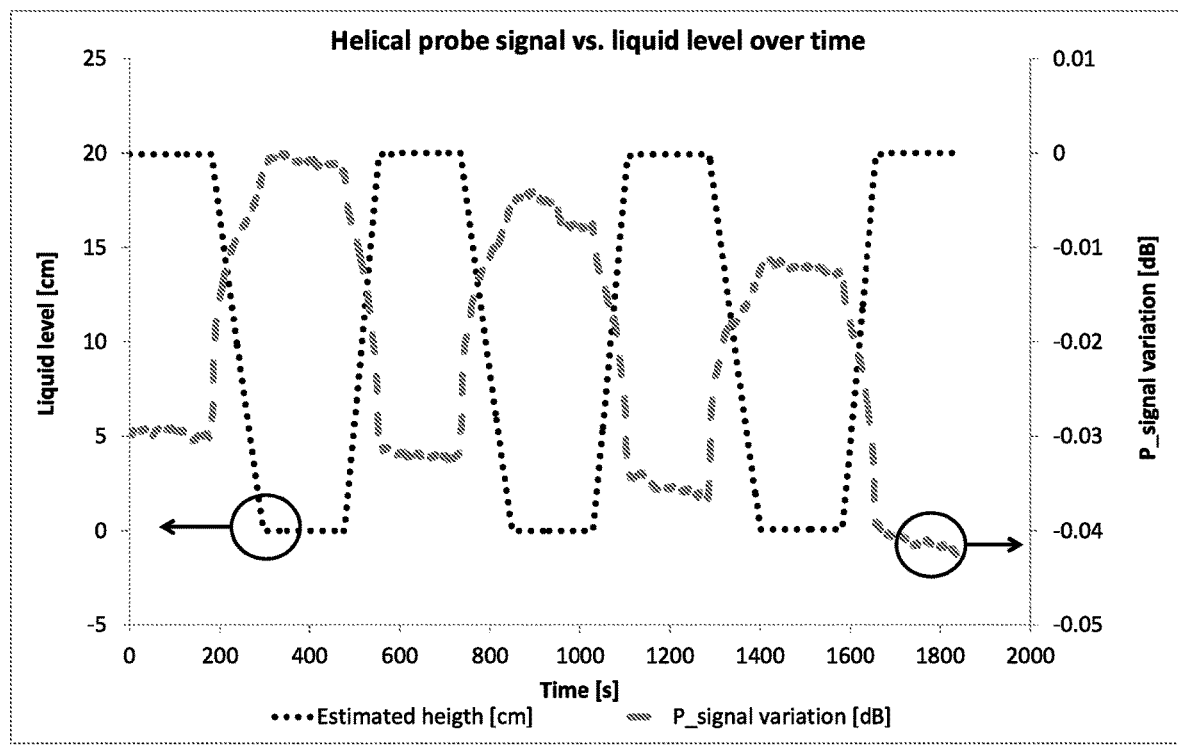
FIG. 3 shows the variation of optical power vs the variation of the liquid level over time for the helical arrangement in accordance with an illustrative embodiment.

FIG. 3 shows the results of output power signal variation measurements taken with the helical probe while the tank was cycled from full to empty to full three times. The left-hand scale and the dotted plot show the variation in liquid level, while the right-hand scale and the dashed plot show the detected output power signal variation.

Figure 4:
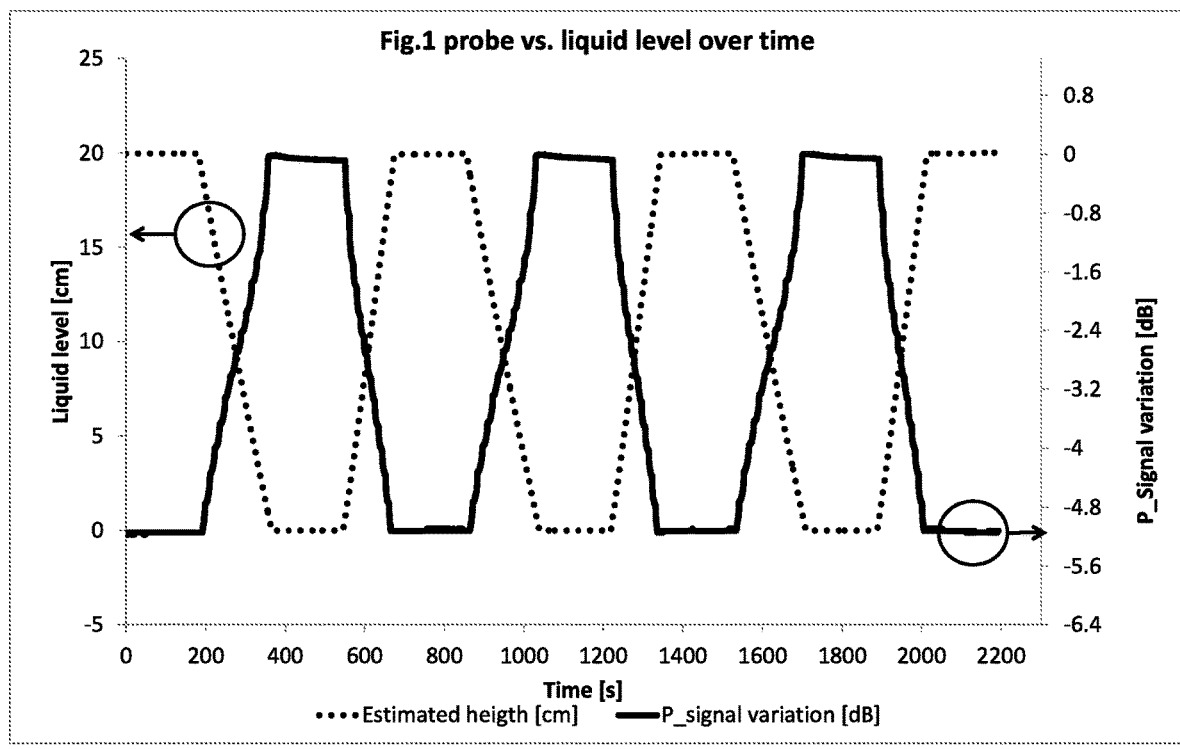
FIG. 4 shows the variation of optical power vs the variation of the liquid level over time for the fluid level sensing device of FIG. 1 in accordance with an illustrative embodiment.

FIG. 4 shows the results of output power signal variation measurements taken with the fluid level sensing device of FIG. 1 while the tank was cycled from full to empty to full three times. The left-hand scale and the dotted plot show the variation in liquid level, while the right-hand scale and the solid plot show the detected output power signal variation.

From FIG. 3, it can be seen that the signal variation for the helical probe is relatively low. It can also be seen that the tracking of the liquid level variation is inconsistent and appears to be subject to drift over time. It is understood that the higher order propagation modes are lost or strongly absorbed within the first few turns of the helical probe, and that only the lower order modes can be sustained by the helical probe. These lower order modes are less affected by the presence of liquid than higher order modes, thereby reducing the sensitivity of the helical probe. One approach to seek to enhance the sensitivity of the helical probe may be to reduce the 'angle of attack' of each winding around the core mandrel of the helical probe. This leads to an increase in the number of windings per vertical unit of length of the probe, effectively increasing the overall length of optical waveguide exposed to the liquid. However, this approach also brings a further disadvantage. A small angle of attack means a more horizontal positioning of the fiber around the core mandrel, which can in turn lead to liquid being trapped around and in proximity of the fiber, even when the liquid level is low. This undesired phenomenon may lead to reduced sensitivity and unstable liquid level readings, especially when fluid abruptly clears out due to vibration or loss of liquid surface tension.

From FIG. 4, it can be seen that the signal variation for the arrangement of FIG. 1 is significantly, orders of magnitude higher. It can also be seen that the tracking of the liquid level variation is consistent and reproducible over time. As such, the arrangement of FIG. 1 can be seen to provide a significant improvement in sensitivity and consistency for a fluid level sensing device.

Referring back to FIG. 1, the optical waveguide 20 may be provided by an optical fiber. The optical fiber may be glass or plastic. In one or more embodiments, the optical structure of the optical waveguide 20 is chosen so that the signal losses are maximized when wetted by a liquid. Suitable optical structures may include, but are not limited to: core-only optical fibers (commonly known as monofilaments); fibers with one or more cladding layers; fibers with cladding thickness considerably smaller than core radius (commonly known as thin-cladded fibers); fibers whose core diameter and material have been selected and/or optimized for optical and chemical compatibility, mechanical and enhanced sensing purposes; fibers whose cladding thickness and material have been selected and/or optimized for optical, chemical compatibility, mechanical, core-protection and enhanced sensing purposes; fibers where the core and cladding are not concentric; fibers where multiple cores are used; fibers where at least part of the waveguide structure is made of a material with enhanced scattering properties; fibers in which Fiber Bragg Gratings (FBGs) have been added to shift the propagating mode outside the core; or any other optical structure in which the exposure of the travelling signal to the surrounding medium is purposely enhanced or maximized.

In another embodiment, the optical waveguide 20 may be a transparent rod. The rod may be bent into the desired shape or pattern accordingly. This may be of use in applications where an optical waveguide with a larger diameter or cross section is desired. Generally, an optical fiber may have a core size of the order of μm up to a few mm in diameter or cross section, whereas a rod may have a larger diameter or cross section of the order of mm to cm.

In another embodiment, the value of the refractive index or refractive indices and their variation profile along the cross section of the optical waveguide 20 is chosen to purposely enhance or maximize the performance of the fluid level sensing device. This may include, but is not limited to, the use of monofilaments, step-index fibers, and graded-index fibers.

In another embodiment, the refractive index or refractive indices of the optical waveguide 20 are chosen so that the sensitivity of the device can be configured to be selective against the presence and level of different liquids with different refractive indices, or other optical properties; for example, for use with fluids such as water and fuel. In particular, the refractive index/indices is selected to make it possible to measure only the level in the container—and therefore the available quantity—of only one of the fluids. For example, the refractive index or indices of at least part of the optical waveguide may be chosen to be higher than the refractive index of water, but lower than the refractive index of fuel. In this way, significantly more light would be lost in the portion of the optical waveguide wetted by fuel compared with the portion wetted by water. As a consequence, the fluid level sensing device would be configured to respond principally to the volume of fuel in the container, and to disregard or minimize the effect due to the volume of water in the container.

Figure 5:
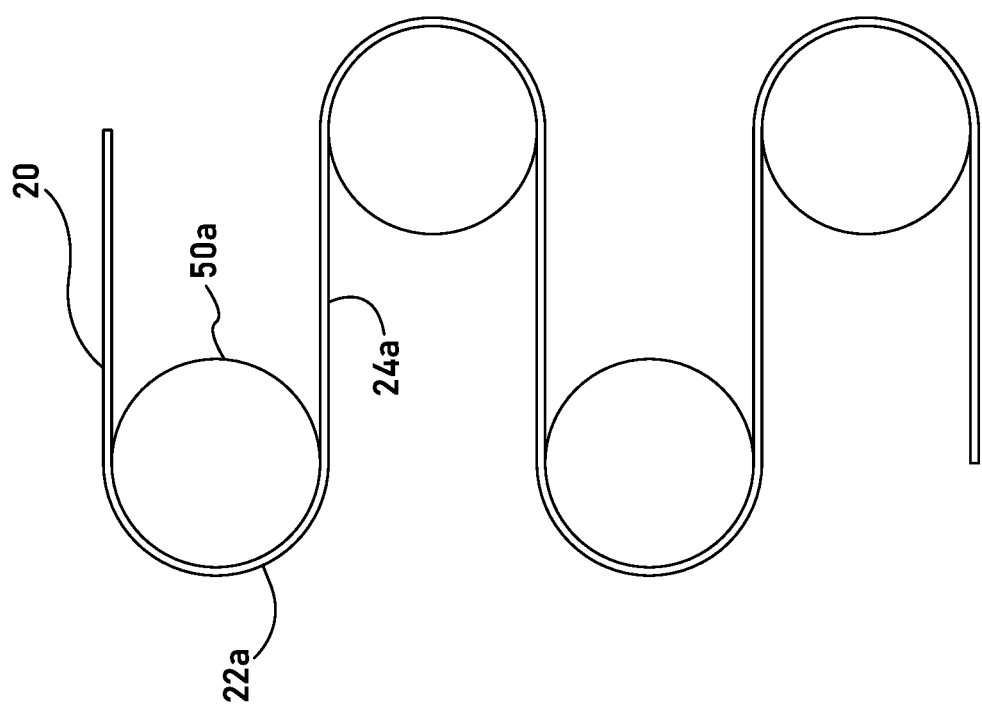
FIG. 5 schematically shows a fluid level sensing device in accordance with one embodiment, employing a frame in accordance with an illustrative embodiment.

FIG. 5 shows a fluid level sensing arrangement similar to that shown in FIG. 1. However, the embodiment shown in FIG. 5 includes a frame or support structure. The frame includes a plurality of guide members 50 which define the location, shape, and size of the curved portions 22 of the optical waveguide 20. The optical waveguide 20 is curved or bent around, and supported by, the guide members 22. In the embodiment shown in FIG. 5, the guide members 50 are round disks, but other shapes and curvatures of the guide member may be employed in other embodiments. For example, the guide members may be circular, semi-circular, elliptical, or of varying curvature. The guide members 50 may take the form of plates and be provided with a peripheral groove for engaging and securing the optical waveguide 20 around the guide members. The guide members of the above embodiments may help to facilitate the installation and retention of the optical waveguide, especially in the form of an optical fiber, in the frame. Other forms of guide member may alternatively be used. Each guide member may be provided by a supporting component having an intermediate step or recess for at least partially accepting the optical waveguide. For example, three discrete or unitary disks may be provided, with the central disk being smaller than the outer disks, to provide the engaging recess for the optical waveguide. Instead of disks, the supporting component may take other shapes or forms while still providing the guide member function for the curved portions of the optical waveguide.

Providing a rigid structure which at least partially supports the optical waveguide 20 may be advantageous in applications in which the container holding the fluid(s) is not stationary or stable on the ground, but can be subject to significant movements from many directions; for example, in the case of a car or aircraft fuel tank.

The optical waveguide 20 may be held in a desired arrangement using a set of guide members 50. The guide members 50 may have curved structures, such as, but not limited to, round disks, elliptical disks, or any other structure with circular, semi-circular, or a varying curvature shape. A peripheral groove or other type of retaining structure may be used to further hold and secure the optical waveguide in a desired configuration.

In some embodiments, the guide members 50—and therefore the curved portions 22 of the optical waveguide 20—may have a radius of curvature selected so that commercially available, off-the-shelf optical fibers may be used to sense the liquid level with the desired or required sensitivity. The desired or optimum radius of curvature may depend on several factors, such as, but not limited to, the magnitude of the induced optical losses or the mechanical and/or optical properties of the optical waveguide, such as acceptable minimum bend radius, optical guiding properties and/or refractive index values and profile. The desired or optimum radius of curvature for any particular waveguide is understood to strongly depend on the material, refractive index profile, and diameter of the optical waveguide or optical fiber. Generally, a working range for the radius of curvature has been found to be 2.5 to 50 times the diameter of the optical waveguide or optical fiber.

Figure 6:
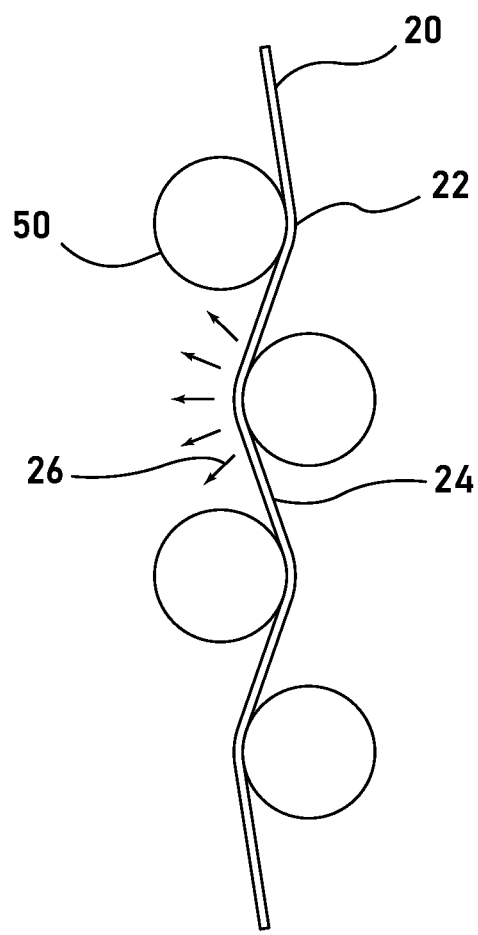
FIG. 6 schematically shows a fluid level sensing device in accordance with another embodiment, with an alternative disposition of the optical waveguide in accordance with an illustrative embodiment.

FIG. 6 shows another embodiment in which the optical waveguide 20 is not wound or curved around the outermost edges of the guide members 50. In this embodiment, the optical waveguide 20 runs between the guide members 50. This provides for a set of shallower curved portions 22 for applications where this may be desirable.

Figure 7:
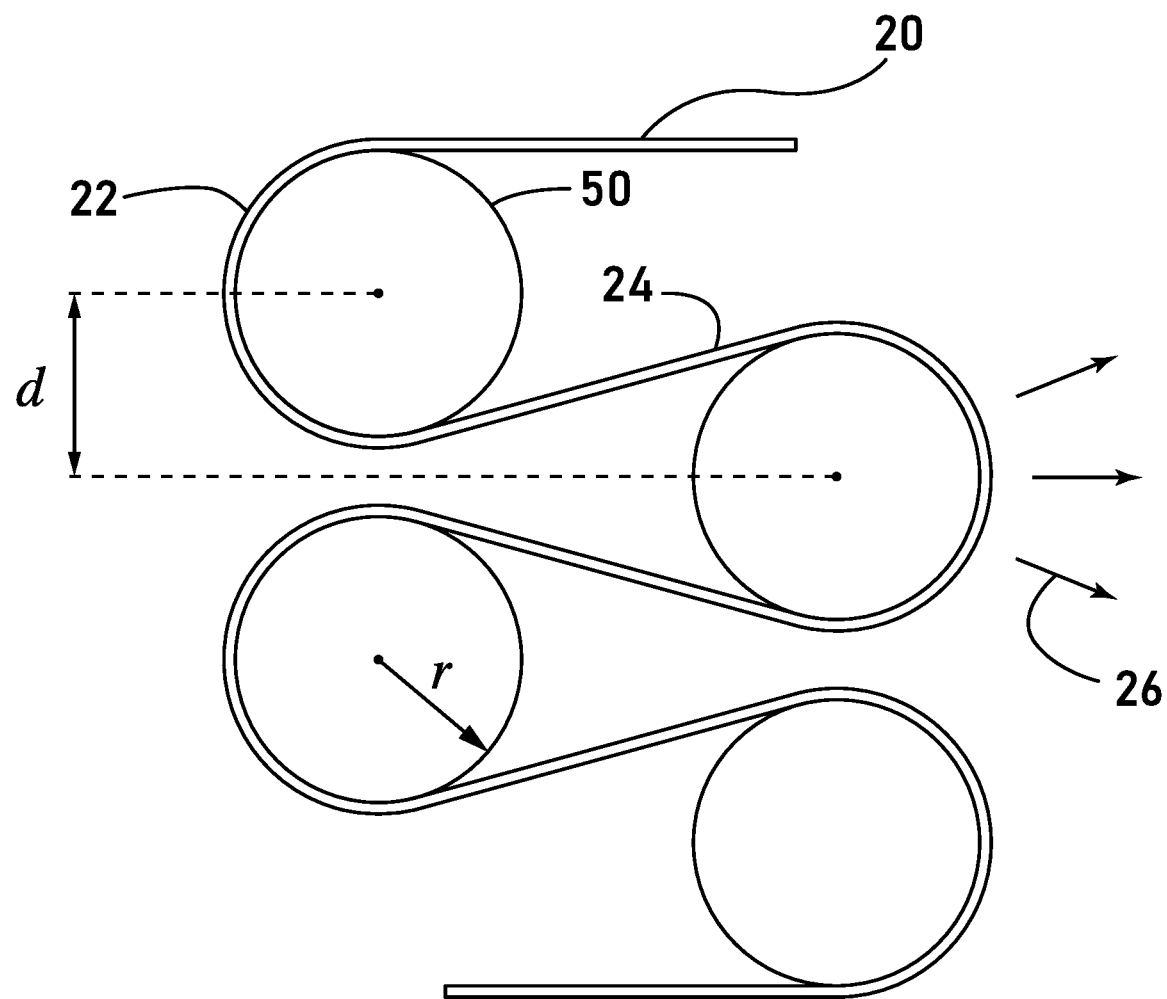
FIG. 7 schematically shows a fluid level sensing device in accordance with another embodiment, with overlapping curved portions in accordance with an illustrative embodiment.

FIG. 7 shows an arrangement of guide members 50 which leads to the curved portions 22 of the optical waveguide 20 being curved or bent through more than 180°. In other words, at least a sensing portion of the optical waveguide 20 is configured to extend in a first direction, the first direction being substantially perpendicular to the interface 12 between the first and second fluids 14, 16. Successive curved portions 22 are spaced in the first direction and overlap in the first direction such at least one curved portion is present at any point in the first direction in the sensing portion of the optical waveguide 20. In this way, parts of the curved portions which are subject to significant light loss (for example, the first part of the bend of each curved portion in the direction the light is configured to approach, such as the first half, or up to the first two-thirds, of each curved portion in the direction the light is configured to approach) may be configured to extend in the first direction in a continuous arrangement. In other words, the curved portions 22 of the optical waveguide 20 are configured to provide for light loss, for a given direction in which the light is configured to approach, at any point in the first direction from one or other curved portion of the sensing portion. For example, for guide members 50 having a radius r, and a separation d in the first direction between successive curved portions 22, the arrangement shown in FIG. 7 has separation d being less than 2r. In this way, the sensing device may provide a continuous curved—and therefore light loss prone or susceptible—component of the optical waveguide along the full extent of the sensing portion of the optical waveguide 20. Continuous measurement of the fluid level throughout the sensing portion may thereby be achieved.

In other embodiments, the vertical distance between the centers of curvature of any two subsequent bends may be larger, equal to, or smaller than the radius of curvature of at least one of the bends. The sensitivity of the sensing device along the first direction (or vertical axis of the probe) may thereby be controlled and/or optimized for any particular application.

In a variation of the structure described above, the vertical distance between the centers of curvature of any two subsequent bends may be dynamically varied along the vertical axis of the probe, so that various levels of sensitivity may be achieved for different liquid levels inside the vessel.

Figure 8:
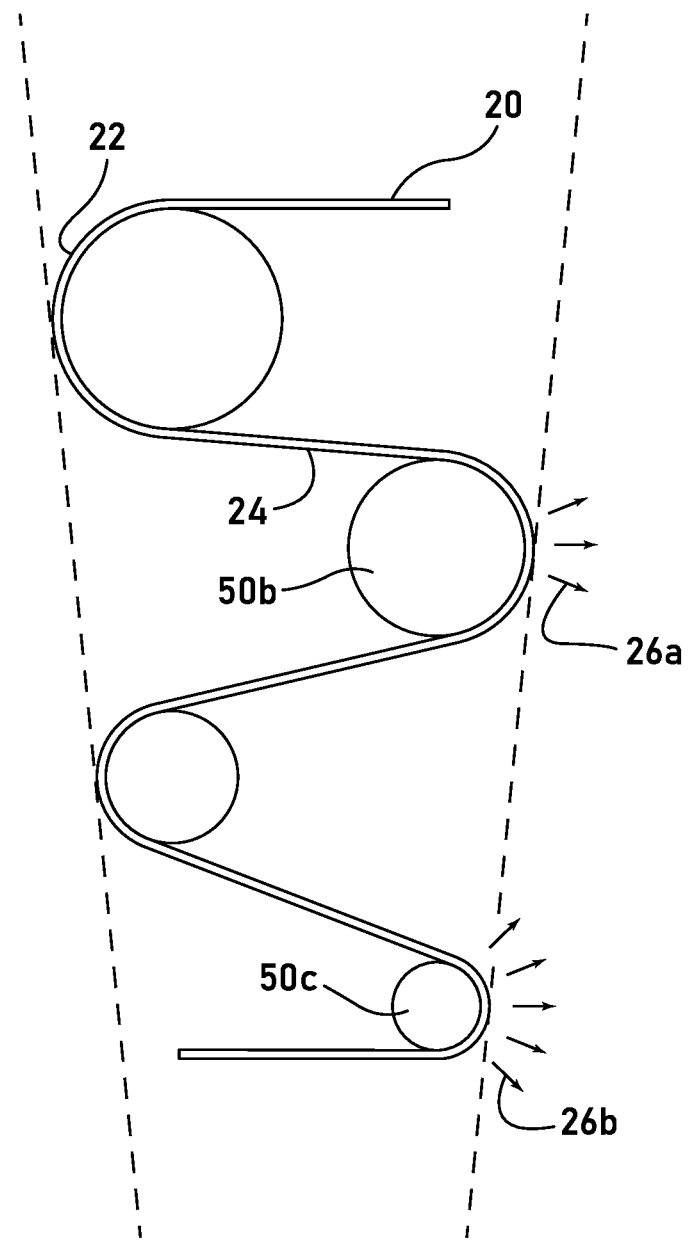
FIG. 8 schematically shows a fluid level sensing device in accordance with another embodiment, with curved portions of varying size in accordance with an illustrative embodiment.

FIG. 8 shows a further embodiment in which the guide members 50 vary in size from guide member to successive guide member. For example, the radius of curvature of successive guide members 50—and therefore successive curved portions 22—may be reduced so that the sensitivity of the sensing device may be adjusted along the first direction (or the vertical axis). This configuration may help to enhance or optimize the sensitivity of the sensing device along the first direction, for example, to provide increased sensitivity at the bottom of the container. It can be seen schematically from the arrows 26*a* that there is a lower optical loss with a larger curved portion than with a smaller curved portion at guide member 50*c*, where arrows 26*b* indicate a greater optical loss.

In a different embodiment, successive guide members may increase in size, for particular applications.

Figure 9:
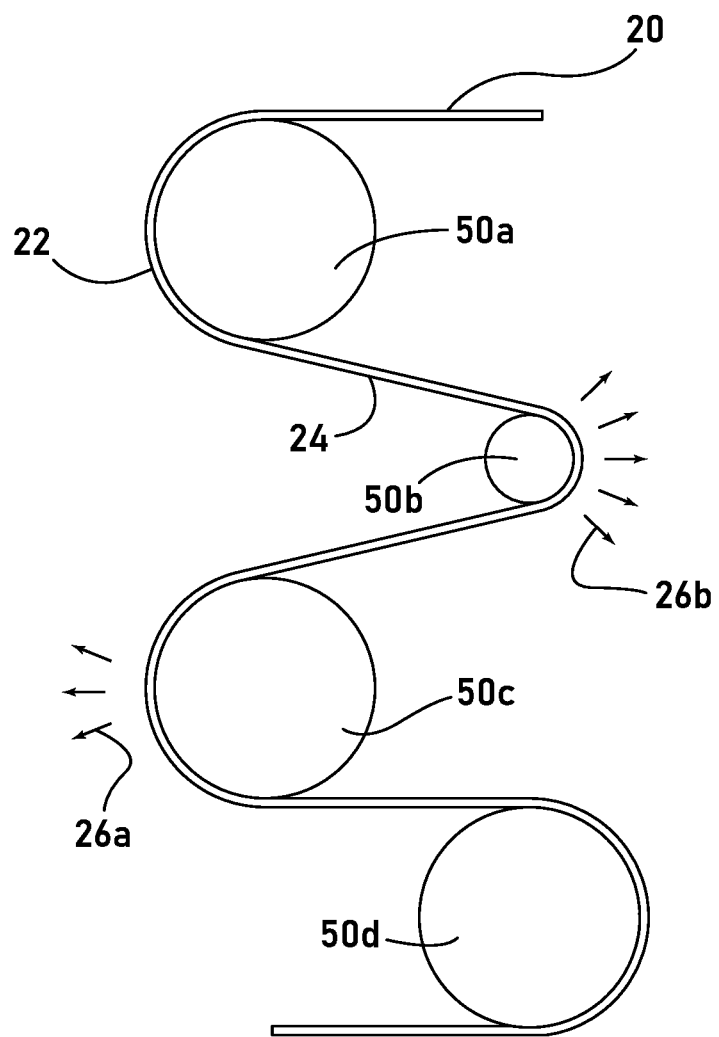
FIG. 9 schematically shows a fluid level sensing device in accordance with another embodiment, with a curved portion of reduced size in accordance with an illustrative embodiment.

FIG. 9 shows an embodiment in which one of the guide members 50*b* is significantly smaller than the other guide members 50*a,c,d*. The effect of the significantly smaller guide member 50*b* is to provide a marked increase in optical losses from the curved portion of the optical waveguide 20 supported by the guide member 50*b*. In this way, with increased light loss at a relatively smaller bend, as indicated by arrows 26*b*—for example, having a smaller radius of curvature for a round bend—the detected output light may show a distinct or marked change for fluid levels at or near that particular curved portion. As such, the marked change in detected output light can be readily correlated to the known level of the particular curved portion, allowing for the sensing device to self-calibrate during use, to avoid any potential mis-readings due to drift etc.

For example, the radius of curvature of at least one bend may be reduced by 10% or considerably more when compared to the adjacent bends, in order to increase the optical losses associated with that or those specific bends. The resulting enhanced optical losses will occur when the fluid reaches the specific and pre-defined levels inside the container corresponding to the reduced or tighter bends, and could be easily recognized or observed by a processing unit. A software routine may be configured to recognize these specific levels and to re-calibrate the response of the fluid level sensing device, to enhance and maintain its accuracy over extended periods of time.

Figure 10:
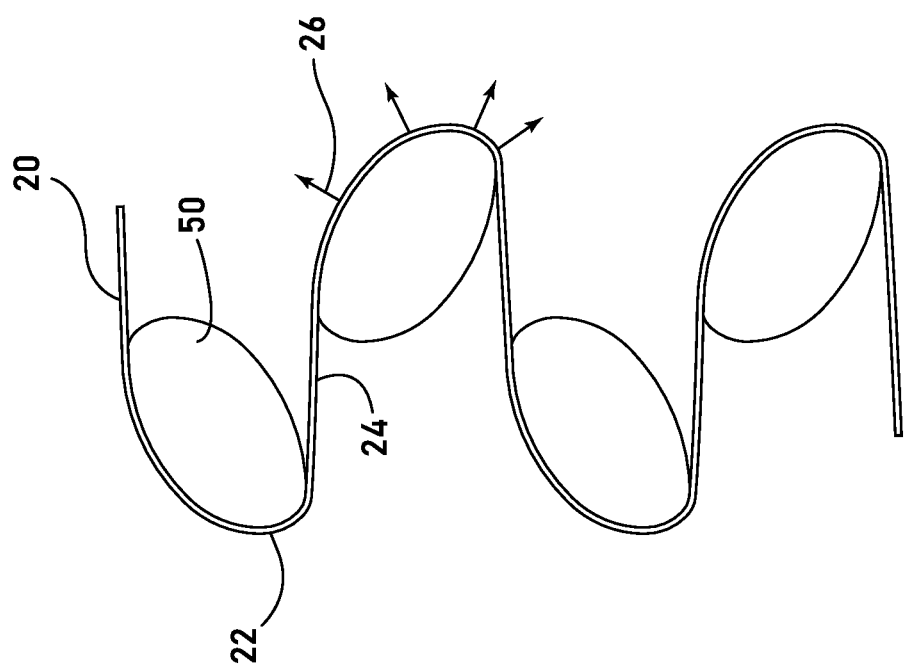
FIG. 10 schematically shows a fluid level sensing device in accordance with another embodiment, with curved portions of varying curvature in accordance with an illustrative embodiment.

FIG. 10 shows an embodiment in which the guide members 50 do not have a constant curvature, or constant radius of curvature. Instead, the guide members 50 have a varying curvature which engages and supports the optical waveguide 20. For example, a radius of curvature of a guide member 50 may be varied around the bend; for example, having a reducing radius of curvature along the bend. In this way, the properties of the optical waveguide 20 around each curved portion or bend may be varied, allowing a more gradual loss of optical power within each bend.

Figure 11C:
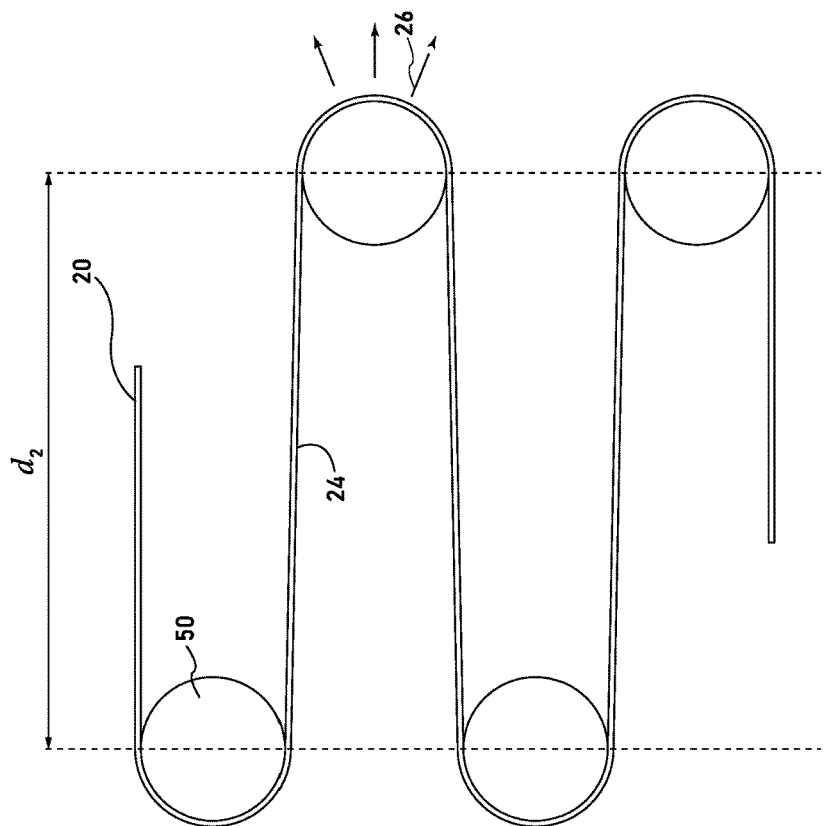
FIGS. 11a-c schematically show different configurations of straight portions between curved portions in accordance with another embodiment in accordance with an illustrative embodiment.
Figure 11B:
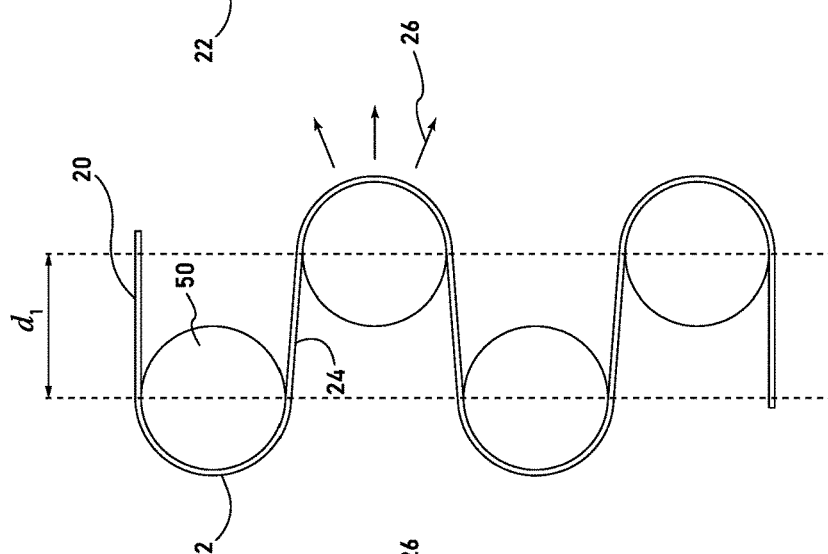
Figure 11A:
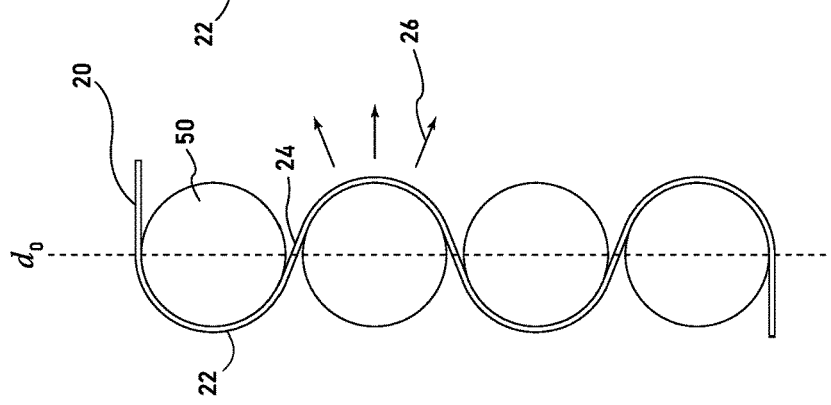

FIGS. 11*a-c* show different embodiments where the length of the interconnecting straight portions 24 between successive curved portions 22 is varied. FIG. 11*a* shows an embodiment in which the straight portions 24 are of minimal, or even zero, length d0. In this configuration, the guide members 50 are effectively stacked above each other in the first, or vertical, direction, with little or no separation in a perpendicular, or horizontal, direction. Figure lib shows an embodiment in which the straight portions 24 are of an intermediate length, d1. In this configuration, successive guide members are separated in the perpendicular, or horizontal, direction by d1 and form an alternating stack in the first, or vertical, direction. FIG. 11*c* shows an embodiment in which the straight portions 24 are of a large, or even maximal, length, d2. In this configuration, successive guide members are separated in the perpendicular, or horizontal, direction by d2 and form an alternating stack in the first, or vertical, direction. The horizontal distance between the centers of curvature of any two successive bends may be varied in order to enhance or optimize the optical properties of the sensing device. For example, it may be desirable to increase the properties of light and mode mixing inside the optical waveguide 20 between successive curved portions 22. It may also be beneficial in facilitating the winding of the optical waveguide 20 around the set of guide members 50.

Figure 12:
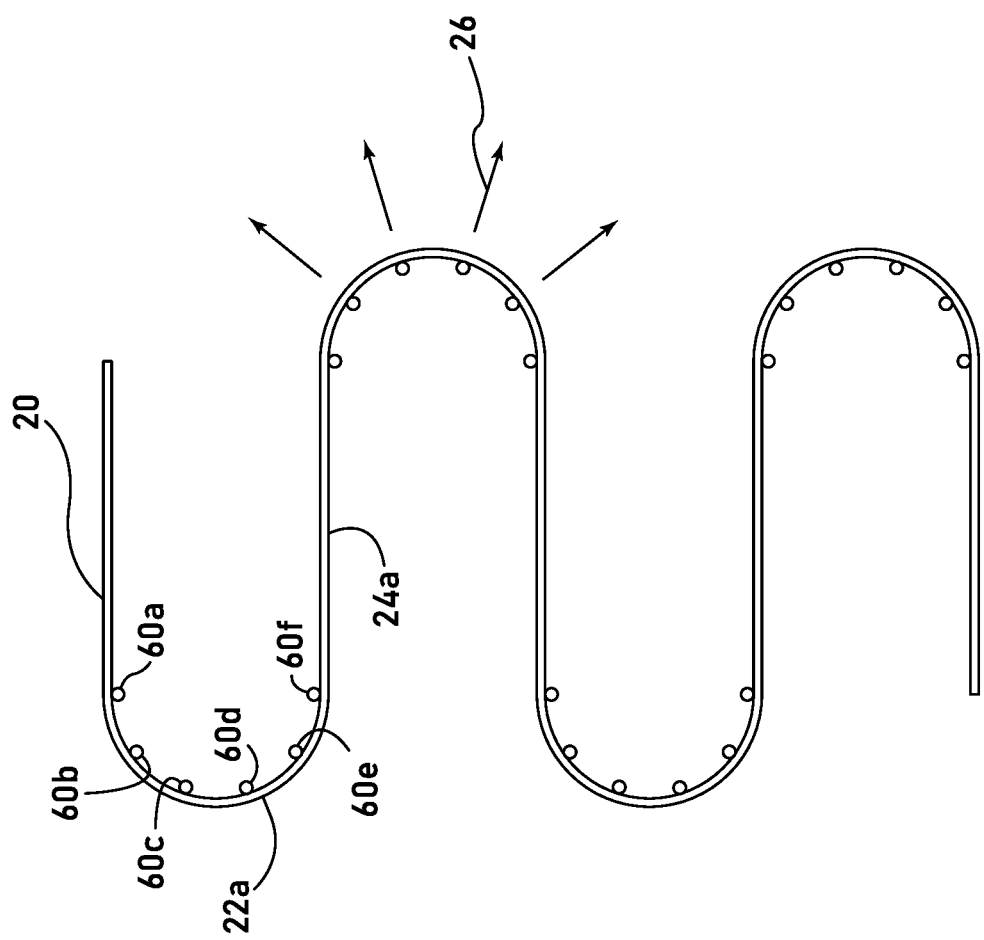
FIG. 12 schematically shows a fluid level sensing device in accordance with another embodiment, employing a different type of frame in accordance with an illustrative embodiment.

FIG. 12 shows an embodiment in which the guide members are provided by a respective set of discrete supports, such as pins 60a-f. Each guide member comprises a set of pins 60a-f, providing or defining a curved pathway around which the optical waveguide may be configured in order to provide the curved portions of the optical waveguide. In this way, the combination of alternating bends of the optical waveguide and the localized pressure exerted on the optical waveguide by the pins can provide for desired or increased optical losses at the curved portions of the optical waveguide 20.

Figure 13:
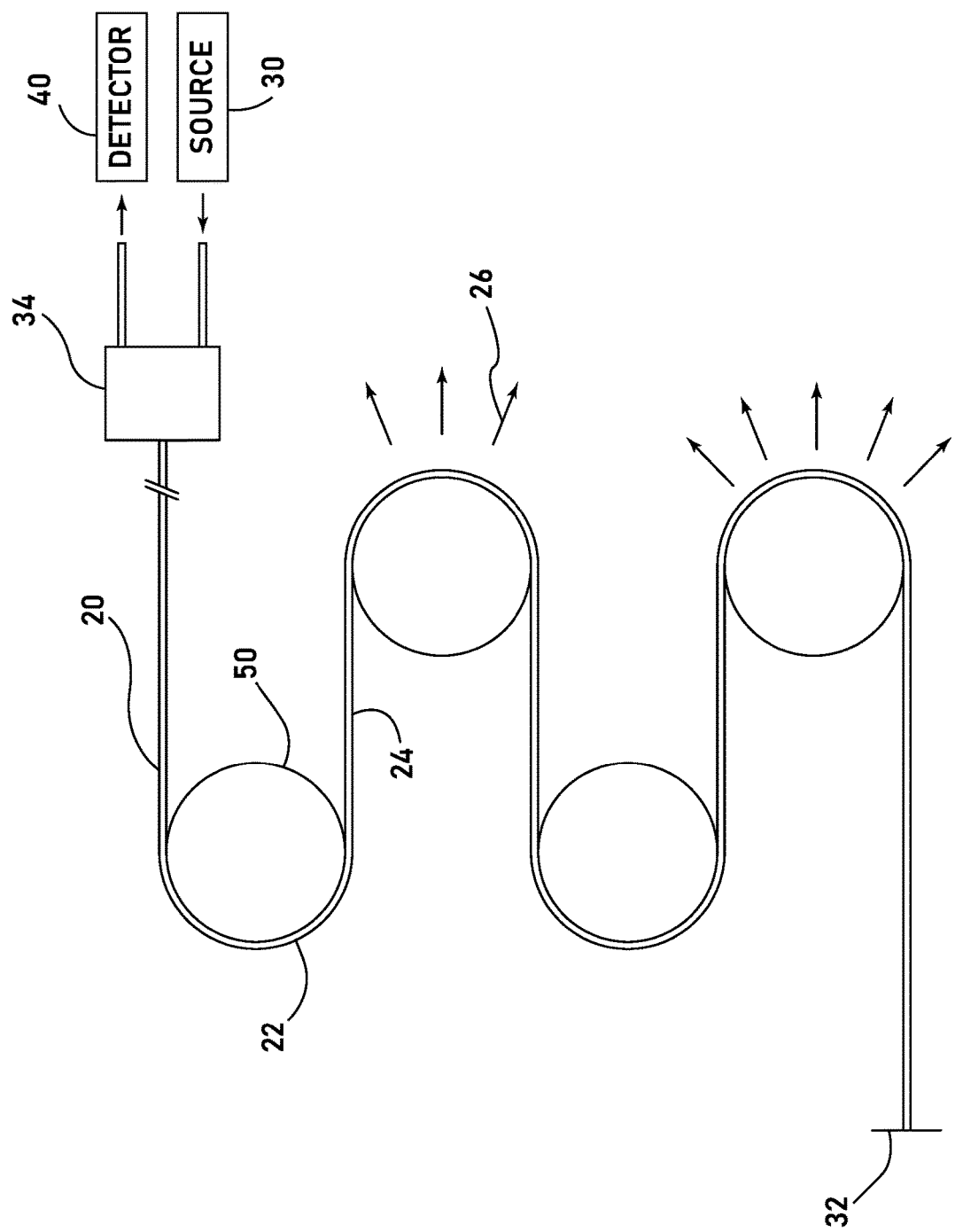
FIG. 13 schematically shows a fluid level sensing device in accordance with another embodiment, with a reflective optical waveguide in accordance with an illustrative embodiment.

FIG. 13 shows an embodiment in which the optical waveguide 20 is provided with a reflective means 32 at one end and the light source 30 and the light detector 40 are configured at the other end of the optical waveguide. The reflective means 32 may comprise a reflective surface such as a mirror. The end of the optical waveguide 20 is adapted so that at least a large percentage of the incoming light is reflected back towards the input side of the optical waveguide 20. In this arrangement, the presence of liquid would further affect the propagation of the light on the return path towards the input side. In order to provide input light, and detect output light, at the same end of the optical waveguide 20, an optical power splitter 34, such as, but not limited to, a Y-junction splitter, may be used. In this way, both the light source 30 and the light detector 40 may be located at the same end of the optical waveguide 20, to simplify construction and installation of the sensing device with a container 18.

Multiple sensing probes may be used to sense the fluid level in different areas of a container, in order to be able to compute the total quantity of fluid present in the container. In some embodiments, this may include a sensing probe constantly immersed in the fluid in order to compensate for variations of the optical properties of the fluid being measured, such as, but not limited to, refractive index.

In other embodiments, multiple optical waveguides may be mounted in close proximity to each other in order to measure the fluid level in the same portion of the container. This may allow for an additional redundancy level in safety-critical applications.

Figure 14:
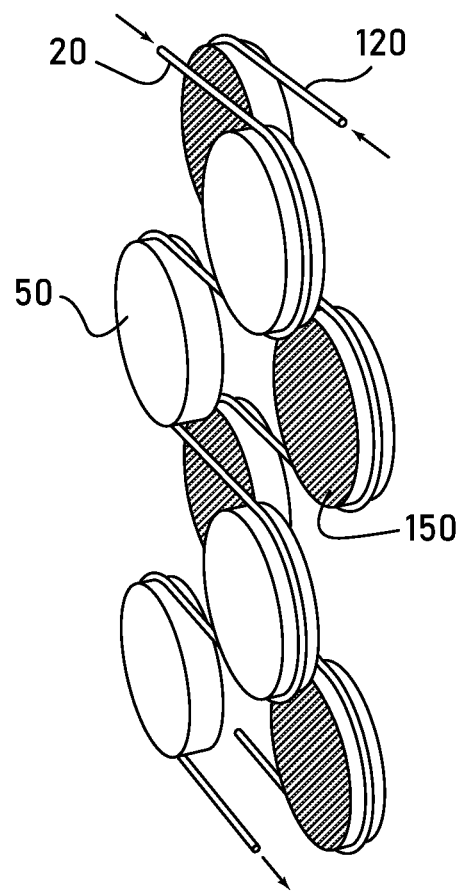
FIG. 14 schematically shows a fluid level sensing device in accordance with another embodiment, with a second optical waveguide in accordance with an illustrative embodiment.

FIG. 14 shows an embodiment in which first and second optical waveguides 20, 120 are provided, along with respective frames and guide members 50, 150. In this embodiment, the second optical waveguide 120 is inverted or offset from the optical waveguide 20, which is also referred to as a first optical waveguide. This may provide for redundancy in measurement, in case of failure of one optical waveguide 20, 120. This may also or alternatively provide additional sensitivity to the sensing device for certain applications.

In some embodiments, the fluid level sensing device 10 may make use of one or more methods to reference the measurement of the fluid level so that undesired effects, such as drift, drop in optical power not due to the fluid being measured, and in general any loss of calibration against a look-up table can be compensated for. This may include, but is not limited to, the use of additional optical waveguides or optical signals whose propagation losses are not, or are differently, influenced by the presence and level of fluid inside the vessel.

In another embodiment, at least one additional protective structure may be used around the sensing device to protect the optical waveguide and frame, if present, during handling and installation. This may also help to avoid the liquid sloshing and frothing around the sensing device in applications in which the liquid is likely to be frequently displaced inside the container. Examples of such protective structure may be a tube with several lateral holes to allow the liquid to maintain the same level inside and outside the protective tube.

In the illustrative example, features of the illustrative examples are described in the following clauses. These clauses are examples of features not intended to limit other illustrative examples.

Clause 1.

A fluid level sensing device for determining the level of the interface between a first fluid and a second fluid in a container, the device comprising:

an optical waveguide for disposal in the container for at least partial immersion in the first fluid;

a light source for providing input light to the optical waveguide; and a light detector for sensing output light from the optical waveguide, wherein the optical waveguide comprises a plurality of curved portions, successive ones of the curved portions being curved in alternating directions, and wherein the optical waveguide is configured such that a curved portion immersed in the first fluid has a greater light loss profile than a curved portion not immersed in the first fluid, and the output light from the optical waveguide provides a measure of the level of the interface based on light loss of the input light through the optical waveguide.

Clause 2.

The fluid level sensing device of clause 1, wherein each of the plurality of curved portions of the optical waveguide is a planar curved portion.

Clause 3.

The fluid level sensing device of clause 2, wherein each planar curved portion lies in the same plane.

Clause 4.

The fluid level sensing device of any preceding clause, wherein each of the plurality of curved portions respectively lies in a plane generally perpendicular to the interface between the first and second fluids.

Clause 5.

The fluid level sensing device of any preceding clause, wherein the optical waveguide further comprises a respective straight portion configured between successive curved portions.

Clause 6.

The fluid level sensing device of any preceding clause, wherein one or more of the plurality of curved portions has a varying curvature.

Clause 7.

The fluid level sensing device of any of clauses 1 to 5, wherein the plurality of curved portions have the same size and shape.

Clause 8.

The fluid level sensing device of any of clauses 1 to 6, wherein one or more of the plurality of curved portions comprises a smaller curved portion than the remainder of the plurality of curved portions.

Clause 9.

The fluid level sensing device of any of clauses 1 to 6 and 8, wherein the plurality of curved portions have different sizes and/or shapes.

Clause 10.

The fluid level sensing device of any preceding clause, wherein a sensing portion of the optical waveguide is configured to extend in a first direction, the first direction being substantially perpendicular to the interface between the first and second fluids, and successive curved portions are spaced in the first direction such at least one curved portion is present at any point in the first direction in the sensing portion of the optical waveguide.

Clause 11.

The fluid level sensing device of any preceding clause, wherein the optical waveguide comprises an optical fiber and the device further comprises a frame comprising a plurality of guide members for supporting the optical fiber, each guide member defining a location, shape, and size of a respective one of the plurality of curved portions of the optical fiber.

Clause 12.

The fluid level sensing device of clause 11, wherein each guide member comprises a plate having a peripheral groove, wherein the optical fiber is supported at least by partial engagement with the peripheral grooves of the plates, or wherein each guide member comprises a support means comprising a recessed or retaining portion for at least partial engagement with the optical waveguide, or wherein each guide member comprises a set of discrete support members, such as pins.

Clause 13.

The fluid level sensing device of any preceding clause, wherein the optical waveguide comprises a reflective means at one end and the light source and the light detector are configured at the other end of the optical waveguide.

Clause 14.

The fluid level sensing device of any preceding clause, further comprising a second optical waveguide, wherein the second optical waveguide is inverted or offset from the first optical waveguide.

Clause 15.

The fluid level sensing device of any preceding clause, wherein the first fluid has a first refractive index and the second fluid has a second refractive index, and the optical waveguide has a third refractive index or a combination of refractive indices so that the light loss is increased or maximized for the first fluid relative to the second fluid such that light loss of the input light through the optical waveguide is substantially dependent on the level of the first fluid.

Clause 16.

A container comprising the fluid level sensing device of any preceding clause, optionally wherein the container is a fuel tank of a vehicle.

Clause 17.

A method of determining the level of the interface between a first fluid and a second fluid in a container, the method comprising:

providing input light to an optical waveguide disposed in the container and at least partially immersed in the first fluid;

guiding the input light through a plurality of curved portions of the optical waveguide, successive ones of the curved portions being curved in alternating directions, wherein a curved portion immersed in the first fluid has a greater light loss profile than a curved portion not immersed in the first fluid; and detecting output light from the optical waveguide, the output light providing a measure of the level of the interface based on light loss of the input light through the optical waveguide.

Clause 18.

The method of clause 17, further comprising continuously determining the level of the interface.

Clause 19.

The method of clause 17 or 18, further comprising further transferring optical power of the input light to high-order propagation modes by providing a respective straight portion of the optical waveguide between successive curved portions.

Clause 20.

The method of any of clauses 17 to 19, wherein one or more of the plurality of curved portions comprises a smaller curved portion than the remainder of the plurality of curved portions, further comprising calibrating the determined level of the interface based on an expected change in detected output light at the smaller curved portion.

Clause 21.

The method of any of clauses 17 to 20, wherein the optical waveguide is part of the fluid sensing device of any of claims 1 to 16.

Clause 22.

The method of any of clauses 17 to 21, wherein a look-up table is used to correlate the output light detected and the level of the interface in the container.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A fluid level sensing device for determining a level of an interface between a first fluid and a second fluid in a container, the fluid level sensing device comprising:

an optical waveguide for disposal in the container for at least partial immersion in the first fluid;

a light source for providing input light to the optical waveguide; and a light detector for sensing output light from the optical waveguide, wherein the optical waveguide comprises a plurality of curved portions, successive ones of the curved portions being curved in alternating directions, and wherein the optical waveguide is configured such that a curved portion immersed in the first fluid has a greater light loss profile than a curved portion not immersed in the first fluid, and the output light from the optical waveguide provides a measure of the level of the interface based on light loss of the input light through the optical waveguide, and wherein a sensing portion of the optical waveguide is configured to extend in a first direction, the first direction being substantially perpendicular to the interface between the first and second fluids, and successive curved portions are spaced in the first direction and overlap such that at least one curved portion is present at any point in the first direction in the sensing portion of the optical waveguide.

2. The fluid level sensing device of claim 1, wherein the optical waveguide further comprises a respective straight portion configured between successive curved portions.

3. The fluid level sensing device of claim 1, wherein one or more of the plurality of curved portions has a varying curvature.

4. The fluid level sensing device of claim 1, wherein a first plurality of the curved portions comprises a plurality of curved portions having curved portions of a first size and one curved portion having a curved portion of a second size smaller than the first size.

5. The fluid level sensing device of claim 1, wherein the optical waveguide comprises an optical fibre and the device further comprises a frame comprising a plurality of guide members for supporting the optical fibre, each guide member defining a location, shape, and size of a respective one of the plurality of curved portions of the optical fibre.

6. The fluid level sensing device of claim 5, wherein each guide member comprises a plate having a peripheral groove, wherein the optical fibre is supported at least by partial engagement with the peripheral grooves of the plates, or wherein each guide member comprises a support means comprising a recessed or retaining portion for at least partial engagement with the optical waveguide, or wherein each guide member comprises a set of discrete support members, such as pins.

7. The fluid level sensing device of claim 1, wherein the optical waveguide comprises a reflective means at one end and the light source and the light detector are configured at an other end of the optical waveguide.

8. The fluid level sensing device of claim 1, wherein the optical waveguide is a first optical waveguide and further comprising a second optical waveguide, wherein the second optical waveguide is inverted or offset from the first optical waveguide.

9. The fluid level sensing device of claim 1, wherein the first fluid has a first refractive index and the second fluid has a second refractive index, and the optical waveguide has a third refractive index or a combination of refractive indices so that the light loss is increased or maximised for the first fluid relative to the second fluid such that light loss of the input light through the optical waveguide is substantially dependent on the level of the first fluid.

10. The fluid level sensing device of claim 1, wherein the container is a fuel tank of a vehicle.

11. A method of determining a level of an interface between a first fluid and a second fluid in a container, the method comprising:

providing input light to an optical waveguide disposed in the container and at least partially immersed in the first fluid;

guiding the input light through a plurality of curved portions of the optical waveguide, successive ones of the curved portions being curved in alternating directions, wherein a curved portion immersed in the first fluid has a greater light loss profile than a curved portion not immersed in the first fluid; and detecting output light from the optical waveguide, the output light providing a measure of the level of the interface based on light loss of the input light through the optical waveguide, wherein a sensing portion of the optical waveguide is configured to extend in a first direction, the first direction being substantially perpendicular to the interface between the first and second fluids, and successive curved portions are spaced in the first direction and overlap such that at least one curved portion is present at any point in the first direction in the sensing portion of the optical waveguide.

12. The method of claim 11, further comprising determining the level of the interface at any point within the sensing portion of the optical waveguide.

13. The method of claim 11, further comprising further transferring optical power of the input light to high-order propagation modes by providing a respective straight portion of the optical waveguide between successive curved portions.

14. The method of claim 11, wherein a first plurality of the curved portions comprises a plurality of curved portions having curved portions of a first size and one curved portion having a curved portion of a second size smaller than the first size, further comprising calibrating the determined level of the interface based on an expected change in detected output light at the smaller curved portion.

15. The method of claim 11, wherein the optical waveguide is part of the fluid sensing device of claim 1.

16. The method of claim 11, wherein a look-up table is used to correlate the output light detected and the level of the interface in the container.

17. The fluid level sensing device of claim 1, wherein each curved portion of the plurality of curved portions is a planar curved portion.

18. The fluid level sensing device of claim 17, wherein each planar curved portion of the plurality of curved portions lies in a same plane.

19. The fluid level sensing device of claim 1, wherein each curved portion of the plurality of curved portions is curved through more than 180°.

20. The fluid level sensing device of claim 1, wherein no portion of the optical waveguide intersects any other portion of the optical waveguide.

* * * * *

UNITED STATES PATENT AND TRADEMARK OFFICE
CERTIFICATE OF CORRECTION

| | | |
|---|---|---|
| PATENT NO. | : 11,047,726 B2 | Page 1 of 1 |
| APPLICATION NO. | : 16/557075 | |
| DATED | : June 29, 2021 | |
| INVENTOR(S) | : Marco Zanola and Mark Johnson | |

It is certified that error appears in the above-identified patent and that said Letters Patent is hereby corrected as shown below:

On the Title Page

Item [73], insert -- Advanced Fibreoptic Engineering Ltd., Carterton, Oxfordshire, UK --

Signed and Sealed this
Twelfth Day of September, 2023

*Katherine Kelly Vidal*

Katherine Kelly Vidal
*Director of the United States Patent and Trademark Office*